Patented Sept. 10, 1940

2,214,353

UNITED STATES PATENT OFFICE 2,214,353

PROCESS FOR MAKING CHROMITE REFRACTORY MATERIALS

Gilbert E. Seil, Cynwyd, Pa., assignor to E. J. Lavino and Company, Philadelphia, Pa., a corporation of Delaware No Drawing. Application January 13, 1939, Serial No. 250,800

4 Claims. (Cl. 106—9)

This invention relates to chromite refractories and more particularly to corrected chromite refractories of improved chemical and physical characteristics.

In my United States Patents No. 2,028,017, No. 2,028,018, No. 2,037,600 and No. 2,060,697, I have described the disadvantages of crude chrome ore when used for the manufacture of refractory materials. I have shown in Patent No. 2,028,017 how the ore is physically corrected by heat treatment below the fusion point of the ore but above the critical temperature at which recrystallization of the chromite and redistribution of the gangue minerals take place. I have also described in this patent refractory bodies of superior characteristics made with such physically corrected ore. In my patents No. 2,028,018, No. 2,037,600 and No. 2,060,697 I have described a physically and chemically corrected chromite refractory material made by heat treatment of the chrome ore, in admixture with finely divided magnesium oxide producing compounds, above the critical temperature at which recrystallization of the chromite, redistribution of the gangue minerals, and the formation of forsterite from the magnesium compounds and the magnesium silicate of the ore take place without decomposition of the chromite or fusion of the mass. In these last three patents I have also described refractory bodies, having greatly increased hot strength and other novel and superior characteristics, composed substantially of chromite surrounded and bonded by films of forsterite.

Further research on the elimination of the disadvantages inherent in refractory materials composed of crude chrome ore resulted in my United States Patent No. 2,066,543. In this patent I describe a chromite refractory in which the low melting point magnesium silicate minerals are corrected by conversion to high melting point spinel and mullite. The correction is accomplished by heat treatment of the ore in intimate admixture with calculated amounts of aluminum oxide ($Al_2O_3$), or materials yielding $Al_2O_3$ for the necessary reactions, at a temperature above the critical point at which recrystallization of the chromite, redistribution of the gangue and formation of the magnesia-alumina spinel ($MgO.Al_2O_3$) and mullite ($3Al_2O_3.2SiO_2$) take place, but below the fusion point of the mass.

In my co-pending application Serial No. 163,031 filed September 9, 1937 there is described a method of correcting chrome ore for refractory purposes by providing sufficient lime in admixture with the chrome ore to convert the silicate in the chrome ore to calcium orthosilicate, or to monticellite, or both; the calculated addition taking into consideration the percentages of lime and silica in the starting materials; and then under proper and controlled heat conditions recrystallizing the chromite of the ore and converting the lime and silica of the mix to calcium orthosilicate, or monticellite, or both; a portion or all of the magnesium originally combined with the silica being converted to periclase. If the lime-silica ration in the mix is such that the molecular percentage of silica exactly equals the molecular percentage of lime, then these two will unite with an equal molecular percentage of magnesia to form monticellite. If, on the other hand, the molecular percentage of lime is twice the molecular percentage of silica, then only calcium orthosilicate is formed. Percentages between these two figures yield both calcium orthosilicate and monticellite. In other words, the ratio of lime to silica determines definitely whether the product contains calcium orthosilicate or monticellite or a mixture of these two compounds.

The present invention is based upon the discovery that the oxides of other elements in Group II of the Periodic Table, particularly barium and strontium, can be used as correctives for the secondary component in chrome ore. The invention is practiced by heating chrome ore in admixture with a calculated amount of a material which will yield BaO or SrO, the addition being so calculated as to provide sufficient of the desired oxide to convert into orthosilicate all the $SiO_2$ in the mixture, heating the mixture to a temperature above the critical point at which the formation of the desired orthosilicate takes place but below the fusion point of the mass. For example, as a source of BaO I may use witherite ($BaCO_3$) or barite ($BaSO_4$) or as a source of SrO I may use strontianite ($SrCO_3$) or celestite ($SrSO_4$).

The invention may be practiced in several ways:

1. The crude chrome ore, ground to a suitable mesh ratio for the manufacture of refractory shapes may be mixed with the desired amount of barium oxide (or strontium oxide) yielding material, tempered (preferably after premixing in a dry mixer), pressed into brick and then dried and burned in the manner usually practiced in the art, the desired orthosilicate being formed during the burning of the brick.

2. The crude chrome ore may be exposed to a heat treatment (as described in my Letters Patent 2,028,017) preferably in a rotary kiln and at a temperature above 3100° F., by which treatment the chromite of the ore is recrystallized and the gangue minerals redistributed so as to surround the chromite in thin films. After cooling, the ore is ground to a suitable mesh ratio for the manufacture of refractory shapes, and the invention is thereafter followed as in Method 1.

3. The desired proportions of chrome ore, and barium oxide (or strontium oxide) yielding material in intimate admixture and preferably fine ground (for example, to pass a number 20 Bureau of Standards screen) are heated to a dense stabilized clinker at a temperature above the critical point at which recrystallization of the chromite, redistribution of the gangue minerals of the ore, and the conversion of the BaO (or SrO) and silica to orthosilicate takes place, but without fusion of the mass. Upon cooling, the resulting product is ground to a suitable mesh ratio for the manufacture of refractory shapes, and made into a finished refractory body in accordance with the usual procedure. Or the resulting product may be sold, either as produced or ground, as a refractory material to be used in the manufacture of refractory shapes, plastics, etc.

4. The chrome ore, and a portion of the BaO (or SrO) yielding material in intimate admixture and preferably fine ground may be heated to stabilization as described in Method 3. The resulting product, after cooling, is ground to a mesh ratio suitable for brick manufacture, and made into refractory shapes in the usually practiced manner, but adding the remainder of the BaO (or SrO) yielding material while it is being tempered in the wet pan or other mixer.

Barium orthosilicate ($2BaO.SiO_2$) has a melting point of 3191° F. and contains 306.72 parts by weight (83.63%) of BaO and 60.06 parts by weight (16.37%) of $SiO_2$, that is to say that the ratio of BaO to $SiO_2$ by weight is 5.1 to 1. Therefore, in the practice of the invention it is necessary to add to any given chrome ore sufficient barium oxide yielding material to provide 5.1 times the silica of the ore as available BaO.

As examples of the method in which the calculations are made, and by which the invention is practiced, consider a chrome ore of the following typical analysis:

| | Per cent |
|---|---|
| $Cr_2O_3$ | 45.74 |
| $SiO_2$ | 9.17 |
| FeO | 15.42 |
| $Al_2O_3$ | 12.03 |
| CaO | 0.95 |
| MgO | 13.77 |

For the correction of the above chrome ore I may use a commercial witherite of the following analysis:

$BaCO_3$ _____ 93.70% (equivalent to 72.81% BaO).
$SiO_2$ _____ 2.07%.

The silica present in 100 parts by weight of the witherite will require 5.1 times 2.07 parts or 10.35 parts of BaO to form barium orthosilicate, leaving 72.81 parts minus 10.37 parts or 62.46 parts of BaO available for reaction with the silica in the chrome ore. The chrome ore contains 9.17% of silica, and therefore 100 parts by weight of chrome ore requires 5.1 times 9.17 parts or 46.77 parts of BaO to form barium orthosilicate from the silica it contains. Since the witherite contains 62.46% of available BaO, 100 pounds of chrome ore will require $$\frac{46.77}{.6246}$$

or 74.86 pounds of witherite, and having chrome ore and witherite of the analyses given I use a mixture of 100 parts by weight of chrome ore and 74.86 parts by weight of witherite, and produce the refractory material of my invention by one of the four methods described herein.

Instead of witherite, I may correct the chrome ore with barite containing 99.75% $BaSO_4$ (equivalent to 65.54% BaO) and free of silica. In this case 100 parts of chrome ore require $$\frac{46.77}{.6554}$$

or 71.36 parts by weight of barite, and therefore having chrome ore and barite of the analyses given I use a mixture of 100 parts by weight of chrome ore and 71.36 parts by weight of barite, and produce the refractory material of my invention by one of the four methods described herein.

Strontium orthosilicate ($2SrO.SiO_2$) has a melting point of 2899° F. and contains 207.26 parts by weight (77.53%) of SrO and 60.06 parts by weight (22.46%) of $SiO_2$. That is to say, the ratio of SrO to $SiO_2$ by weight is 3.45 to 1. Therefore, in the practice of the invention it is necessary to add to a given chrome ore sufficient SrO yielding material to provide 3.45 times the silica of the ore as available SrO. As an example, for the correction of the chrome ore previously mentioned, I may use strontianite which is strontium carbonate ($SrCO_3$) and which contains 70.1 parts by weight of SrO. The chrome ore contains 9.17% of silica and therefore 100 parts by weight of chrome ore requires 3.45 times 9.17 or 31.6 parts of SrO to form strontium orthosilicate with the silica in the ore. Since the strontianite contains 70.1% of available SrO, 100 parts of chrome ore will require $$\frac{31.6}{.701}$$

or 45.1 pounds of strontianite and having a chrome ore of the analysis given, I use a mixture of 100 parts by weight of chrome ore and 45.1 parts by weight of strontianite and produce the refractory material of my invention by one of the four methods described herein.

Instead of strontianite I may correct the secondary component of the chrome ore to strontium orthosilicate with celestite ($SrSO_4$) which contains 56.4% of available SrO. In this case 100 parts of chrome ore require $$\frac{31.6}{.564}$$

or 56 parts by weight of celestite, and therefore having chrome ore of the analysis given I use a mixture of 100 parts by weight of chrome ore and 56 parts by weight of celestite and produce the refractory material of my invention by one of the four methods described herein.

In the four examples, the volatile constituents of the corrective materials, that is $CO_2$ in the case of witherite and strontianite and the $SO_3$ in the case of barite and celestite are driven off in the heating.

In the practice of my invention it is desirable that the product contain no silicate other than orthosilicate and no uncombined barium oxide or strontium oxide. The invention, however, is not limited to the simple orthosilicates of the examples given. To clarify the above statement it must be borne in mind that the elements magnesium, calcium, strontium and barium form simple orthosilicates, double orthosilicates and complex orthosilicates. The simple orthosilicates have the general formula 2RO.SiO$_2$. The simple orthosilicates are 2MgO.SiO$_2$, 2CaO.SiO$_2$, 2SrO.SiO$_2$ and 2BaO.SiO$_2$. The double orthosilicates have the general formula RO.R'O.SiO$_2$ and examples of the double orthosilicates are BaO.CaO.SiO$_2$, SrO.CaO.SiO$_2$, BaO.MgO.SiO$_2$, etc. The complex orthosilicates have the general formula 3RO.R'O.2SiO$_2$ and examples of the complex orthosilicates are 3BaO.CaO.2SiO$_2$, 3CaO.BaO.SiO$_2$, 3SrO.CaO.SiO$_2$, etc. In the general formula RO and R'O represent MgO, CaO, SrO or BaO.

Wherever the general term orthosilicates is used in these specifications and in the claims attached hereto it signifies an orthosilicate which contains either BaO or SrO or a combination of the two, or an orthosilicate containing either BaO or SrO in combination with either CaO or MgO. The terms silica and silicate are used synonymously in this specification.

The introduction of the double and complex orthosilicates provides a means of control of the melting point of the secondary component of the chromite refractory of my invention. I have found that the double orthosilicates and the complex orthosilicates which contain MgO have slightly lower softening points than the other orthosilicates.

Once formed the orthosilicates of barium and strontium are stable and they do not exhibit the tendency to dusting because of inversion as does the calcium orthosilicate which requires a stabilizer to keep it in the high temperature crystalline form.

The invention is, of course, applicable to other chrome ores than the ones used in the examples, and other materials may be used as the source of BaO or SrO. In every case the magnesia originally combined with the silica in the chrome ore is converted to periclase and is found as periclase in the finished refractory.

The invention is also applicable to other refractory raw materials containing low melting point silicates as an undesirable component which will react with the specified group to form orthosilicates.

Having thus described and exemplified my invention, to which examples the scope of the invention is by no means limited, I claim:

1. The process of making chromite refractories which comprises mixing the chrome ore with an amount of barium oxide yielding material so calculated that the BaO to SiO$_2$ ratio in the mixture is substantially 5.1 to 1, and heating the mixture to a temperature above the critical point at which barium orthosilicate is formed from the BaO and SiO$_2$ present, but below the fusion point of the mass.

2. The process of making chromite refractories which comprises mixing the chrome ore with an amount of strontium oxide yielding material so calculated that the SrO and SiO$_2$ ratio in the mixture is substantially 3.45 to 1, and heating the mixture to a temperature above the critical point at which strontium orthosilicate is formed from the SrO and the SiO$_2$ present, but below the fusion point of the mass.

3. The process of making refractory material from a mixture of chrome ore and an amount of material yielding an oxide from the group consisting of BaO and SrO so calculated as to form orthosilicate from the silica in the mix which comprises the steps of heat treating the chrome ore and a portion of the oxide yielding material at a temperature in excess of 3100° F., thereafter cooling the mass, grinding the resulting material, mixing the ground material with the balance of the oxide yielding material and burning the mixture at a temperature above the critical point at which the desired orthosilicate is formed, but below the fusion point of the mass.

4. The process of making refractories which comprises mixing a mineral containing low melting point silicates with an amount of material yielding an oxide from the group consisting of BaO and SrO so calculated as to form orthosilicate from the silica in the mix, and heating the mixture to a temperature above the critical point at which the orthosilicate is formed from the oxide yielded by the added material and the silica present, but below the fusion point of the mass.

GILBERT E. SEIL.